(No Model.)

W. H. EVANS.
CHURN DASHER.

No. 502,180.        Patented July 25, 1893.

Witnesses

Inventor
W. H. Evans,
By Joseph W. Atkins
Attorney

UNITED STATES PATENT OFFICE.

WILLIAM H. EVANS, OF GAINESVILLE, GEORGIA.

CHURN-DASHER.

SPECIFICATION forming part of Letters Patent No. 502,180, dated July 25, 1893.

Application filed May 27, 1893. Serial No. 475,701. (No model.)

*To all whom it may concern:*

Be it known that I, WILLIAM H. EVANS, of Gainesville, county of Hall, State of Georgia, have invented certain new and useful Improvements in Churn-Dashers, of which the following is a specification, reference being had to the accompanying drawings.

The object of my invention is to produce an improved churn dasher adapted, by its peculiar construction and arrangement of parts, to more thoroughly and speedily break up the milk than dashers of ordinary construction.

Figure 1:
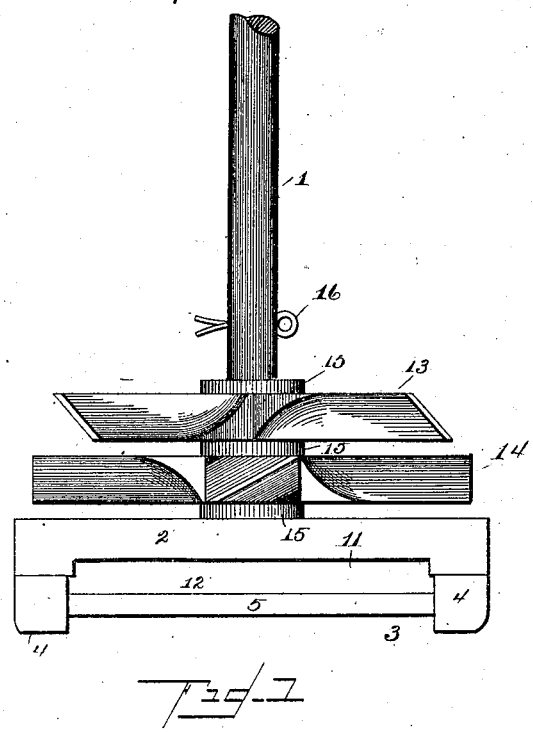
Figure 4:
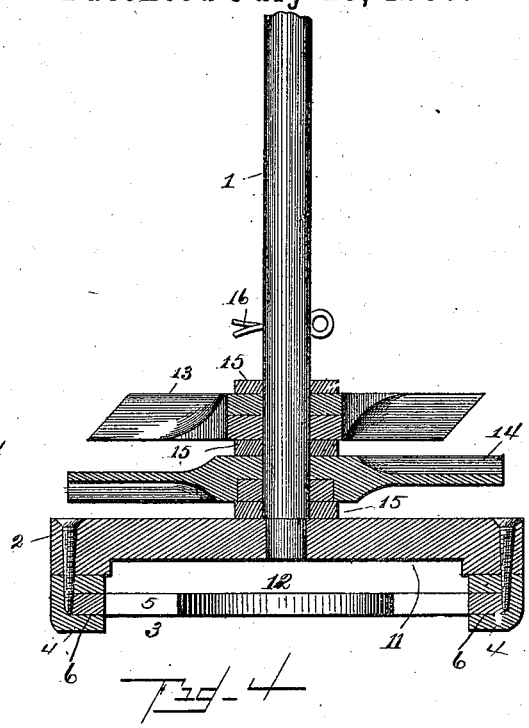
Figure 3:
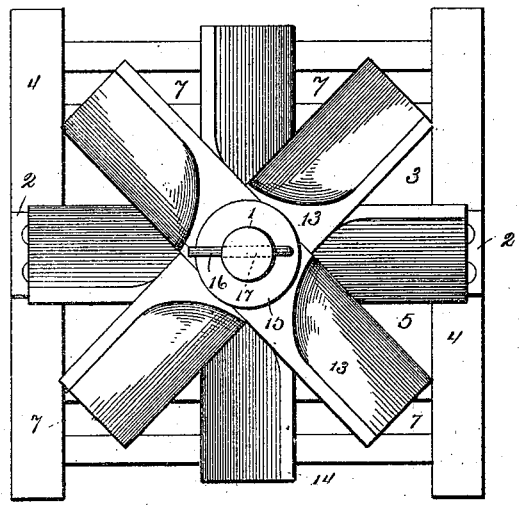
Figure 2:
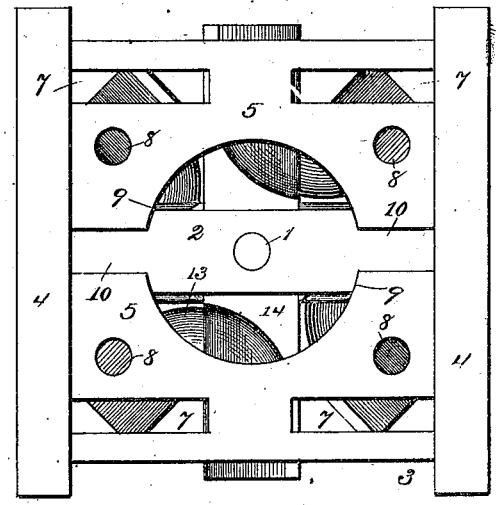

In the accompanying drawings: Figure 1 is a side elevation of my dasher. Fig. 2 is a bottom plan view thereof; and Fig. 3 a top plan view. Fig. 4 is a central longitudinal section.

Referring to the figures on the drawings: 1 indicates a handle firmly secured at its lower end to a bridge 2.

3 indicates a frame preferably consisting of side pieces 4 secured firmly to the ends of the bridge and an intermediate plate 5 secured to the side pieces, as in grooves 6, for example. The plate is preferably pierced by slots 7 and circular apertures 8. In its middle part it is provided with a large circular opening 9 concentric with the handle, and preferably having recesses 10 extending from the aperture 9 in the direction of and underneath the bridge 2. In the bottom of the bridge is provided a longitudinal recess 11 extending from one side piece to the other. By this means an aperture 12, of considerable width, is provided between the top of the plate and the bottom of the bridge so that the liquid through which the dasher moves may pass freely through the aperture 9 and under and around the bridge; but being compelled to twice turn its direction of movement under the impulse of the dasher.

Above the bridge and around the handle are loosely secured paddle wheels 12 and 13, so constructed as, when they are forced through a liquid, to rotate in opposite directions. By their operation, these wheels tend to violently agitate the liquid and quickly and thoroughly break up the milk.

Washers 14 preferably made of impervious fiber are preferably secured above and below and between the wheels. I prefer to permit certain movement of the wheels endwise upon the handle and for this purpose employ a suitable limiting device, as for example, a cotter pin 15 inserted through a diametrical aperture 16 in the handle and at a suitable distance above the bridge, which, of course, serves as a lower stop.

I do not limit myself to the details of construction herein shown and described, because they may be modified somewhat without departing from the scope of my invention.

What I claim is—

1. The combination with a handle, of oppositely rotating paddle wheels longitudinally movable upon said handle, and devices adapted to limit such longitudinal movement of the paddles, substantially as specified.

2. The combination with a handle, bridge secured upon one end thereof, end pieces secured to said bridge, and a perforated intermediate plate therebetween, of oppositely rotating paddle wheels carried on the handle above said bridge, substantially as specified.

In testimony of all which I have hereunto subscribed my name.

WILLIAM H. EVANS.

Witnesses:
J. H. DOZIER,
ANDERSON R. LOGAN.